M. STEPHENS.
Improvement in Devices for Lining Cement Pipes.

No. 126,100.  Patented April 23, 1872.

Witnesses,
Cha. H. Smith
Geo. T. Pinckney

Inventor
Melvin Stephens
Lemuel W. Serrell
atty.

126,100

UNITED STATES PATENT OFFICE.

MELVIN STEPHENS, OF BROOKLYN, NEW YORK.

IMPROVEMENT IN DEVICES FOR LINING CEMENT PIPES.

Specification forming part of Letters Patent No. 126,100, dated April 23, 1872.

*To all whom it may concern:*

Be it known that I, MELVIN STEPHENS, of Brooklyn, in the county of Kings and State of New York, have invented and made an Improvement in Lining Cement Pipes; and the following is declared to be a correct description of the same.

Cement water-pipes have been made of sheet-iron lined with hydraulic cement, but in applying the lining considerable difficulty has been experienced in consequence of the plastic cement settling down before it has become consolidated or set; hence the lining has to be rendered uniform by cutting the surplus off at the lower end and adding cement at the upper end; and this operation has to be done by hand and adds to the cost, besides which the pipe is not perfect. In many instances the cement does not adhere to the iron and falls down in a mass. This is particularly the case with large-sized pipe. The usual way of making the cement pipe is to spread the plastic cement upon the inside of the sheet-metal pipe by means of a conical form that is drawn through the metal pipe. I make use of a cylinder that is introduced behind the conical spreader and sustains the plastic mass until it sets sufficiently to be self-supporting, and this cylinder is made so that it can be contracted to separate it from the cement previous to its being withdrawn.

Figure 1:
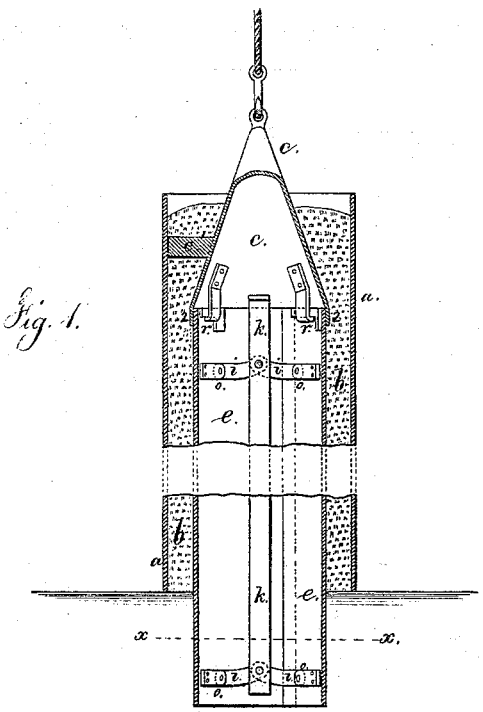
Figure 2:
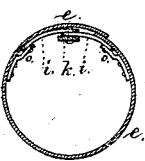

In the drawing, Figure 1 is a vertical section of the cone, cylinder, and pipe as the same is being made. Fig. 2 is a sectional plan at the line $x$ $x$ of the contractible cylinder.

The sheet-iron pipe $a$ is to be lined with a layer of cement, $b$. To effect this the conical spreader $c$ is drawn up through the tube $a$, and the cement resting thereon is spread upon the interior of the tube $a$. There are guide-fins $c'$ to maintain uniformity in the lining that is applied to the pipe. These parts are known and are not claimed. The contractible cylinder $e$ is made of sheet metal, in one or two pieces, and the edges of the metal lap upon each other. To the inside of the cylinder the toggle-joint bars $i$ $i$ are attached at their ends $o$ $o$, and the separate pairs of bars are connected one to the other by the longitudinal bar $k$, so that the toggles can be operated simultaneously to contract or expand the cylinder $e$. It is to be understood that two or more of these pairs of toggle-bars are to be employed, according to the length of the pipe; and if the tube or cylinder $e$ is made of more than one sheet the toggle can be applied at each lapping joint in such cylinder so as to contract the cylinder $e$ at more than one place in its circumference. This contractible cylinder $e$ is to be inserted into the cylinder $a$ immediately after the cement has been spread by the cone $c$, and to facilitate this operation the cylinder $e$ should be introduced within the cylindrical flange 2 of the cone $c$, and united by the bayonet-locks $r$ or other suitable device so as to be drawn into the pipe by the cone in its movement, and after the lining has been spread the cone is to be disconnected from the cylinder $e$ and removed for use elsewhere, while the cylinder $e$ remains to support the cement until it sets or hardens sufficiently. The cement may be pressed into the space by a ring-plunger, if desired. The cylinder $e$ may be expanded by the toggles at the time it is drawn into the pipe by the cone, or it may be expanded after it is in place so as to more fully consolidate the cement, and after the cement has set or hardened sufficiently the cylinder is contracted by bending the toggles sufficiently for loosening the cylinder $e$ from the cement to allow of its removal without injury to the pipe. This cylinder $e$ might be employed in cases where the plastic cement is poured into the space between the pipe $a$ and cylinder $e$.

I claim as my invention—

1. The cylinder $e$, with the toggles connected to the inside thereof, near the lapping edges, for sustaining the cement, and contractible previous to removal, substantially as set forth.

2. The contractible cylinder $e$, connected removably to the conical spreader, substantially as and for the purposes set forth.

Signed by me this 11th day of January, 1872.

MELVIN STEPHENS.

Witnesses:
GEO. T. PINCKNEY,
CHAS. H. SMITH.